(12) United States Patent
Lin

(10) Patent No.: US 7,917,026 B2
(45) Date of Patent: Mar. 29, 2011

(54) SHUTTER AND CAMERA MODULE WITH SAME

(75) Inventor: Tsung-Yu Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/472,299

(22) Filed: May 26, 2009

(65) Prior Publication Data
US 2010/0021156 A1     Jan. 28, 2010

(30) Foreign Application Priority Data
Jul. 22, 2008   (CN) .......................... 2008 1 0302879

(51) Int. Cl.
*G03B 7/083* (2006.01)
(52) U.S. Cl. ........................................ 396/249; 359/295
(58) Field of Classification Search .................. 396/249, 396/475; 359/295
See application file for complete search history.

(56) References Cited

U.S. PATENT DOCUMENTS

| | | | | |
|---|---|---|---|---|
| 2,705,903 A | * | 4/1955 | Marshall | 359/249 |
| 3,476,029 A | * | 11/1969 | Schreckendgust | 396/457 |
| 4,640,621 A | * | 2/1987 | Rose | 356/434 |
| 5,408,353 A | * | 4/1995 | Nichols et al. | 359/275 |
| 2004/0183965 A1 | * | 9/2004 | Lundgren | 349/113 |
| 2004/0263669 A1 | * | 12/2004 | Kobayashi | 348/340 |
| 2007/0002422 A1 | * | 1/2007 | O'Shaughnessy | 359/265 |
| 2007/0133983 A1 | * | 6/2007 | Traff | 396/506 |
| 2008/0085113 A1 | * | 4/2008 | Hsiao | 396/457 |
| 2008/0124072 A1 | * | 5/2008 | Yuan | 396/457 |
| 2009/0046977 A1 | * | 2/2009 | Thapliya et al. | 385/23 |

* cited by examiner

*Primary Examiner* — Rodney E Fuller
*Assistant Examiner* — Fang-Chi Chang
(74) *Attorney, Agent, or Firm* — Raymond J. Chew

(57) ABSTRACT

A shutter includes a first light-pervious electrode, a second light-pervious electrode, a light-shielding layer sandwiched between the first and second light-pervious electrodes and a voltage supplying system. The light-shielding layer is comprised of an electrostrictive material. The light-shielding layer has a fixed end positioned adjacent to one edge of the first light-pervious electrode, and a free end facing toward the opposite edge. The free end is extendable towards the opposite edge of the first light-pervious electrode to block light from in response to a voltage applied to the light-shielding layer. The voltage supplying system is electrically connected with the first and second light-pervious electrodes for supplying a voltage between the first and second light-pervious electrodes.

16 Claims, 5 Drawing Sheets

SHUTTER AND CAMERA MODULE WITH SAME

BACKGROUND

1. Technical Field

The present invention relates to image technology and, particularly, relates to a shutter with electrostrictive material and a camera module having the shutter.

2. Description of Related Art

Shutters control the exposure time of light-sensitive members (i.e., photographic films or electronic image sensors) in cameras. A high quality shutter should have an excellent light-switching effect and a fast response time.

Most shutters are mechanical, in nature, and include a complex arrangement of blades, gears, springs, and/or motors. Thus, these mechanical shutters tend to be bulky. Additionally, mechanical shutters may be noisy because friction between elements thereof. Accordingly, cameras equipped with mechanical shutters often are bulky and noisy.

Therefore, it is desirable to provide a shutter and a camera module, which can overcome the above mentioned problems.

BRIEF DESCRIPTION OF THE DRAWINGS

Many aspects of the present shutter and camera module should be better understood with reference to the following drawings. The components in the drawings are not necessarily drawn to scale, the emphasis instead being placed upon clearly illustrating the principles of the present shutter and camera module. Moreover, in the drawings, like reference numerals designate corresponding parts throughout the several views.

DETAILED DESCRIPTION

Embodiments will now be described in detail with reference to the drawings.

Figure 1:
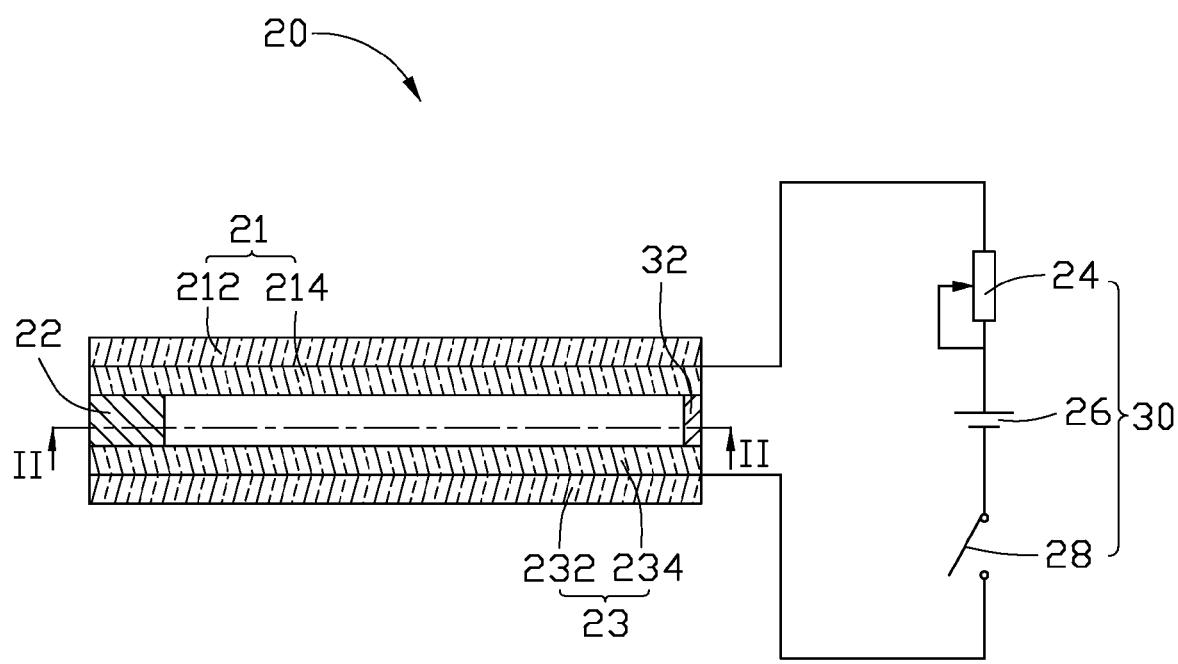
FIG. 1 is a schematic, cross-sectional view of a shutter in accordance with a first exemplary embodiment, the shutter being in a first state.
Figure 2:
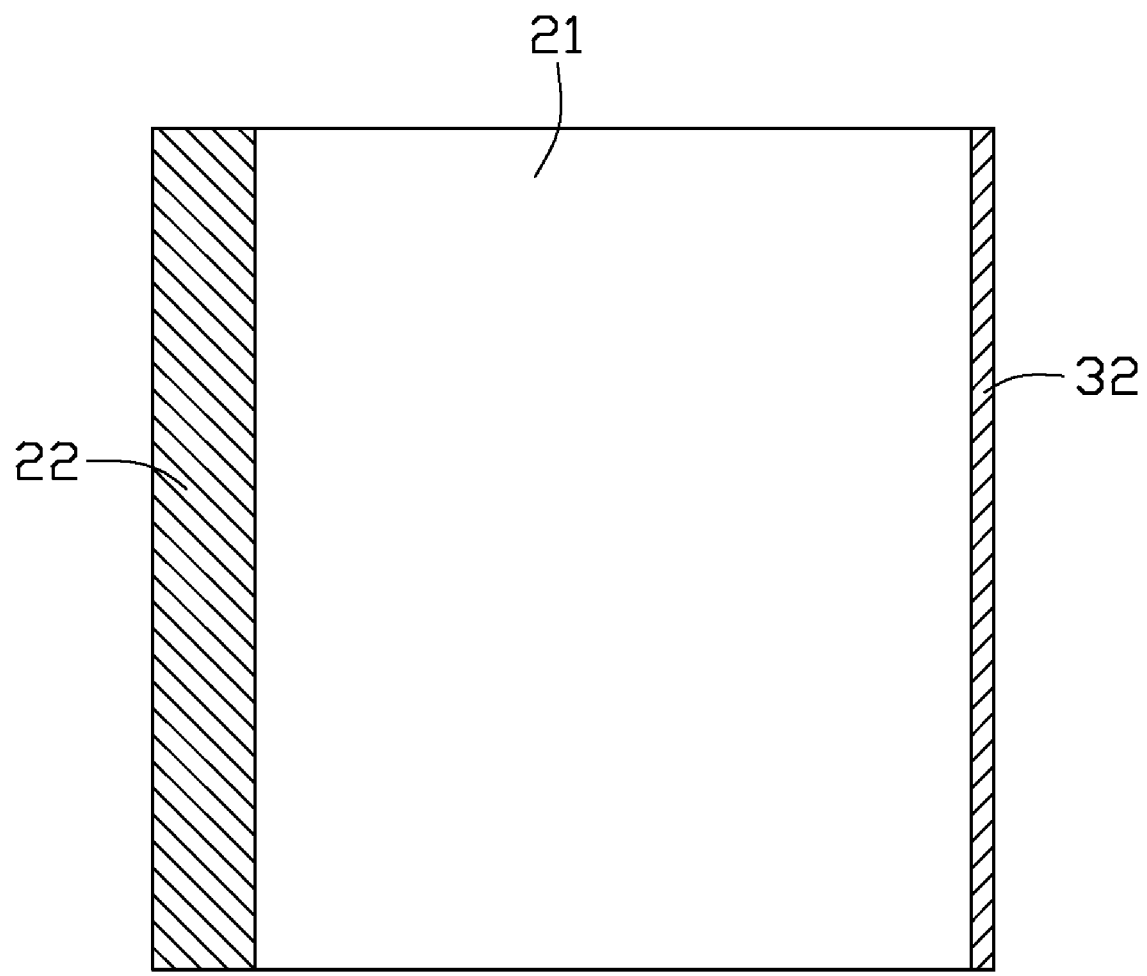
FIG. 2 is a cross-sectional view of the shutter of FIG. 1, taken along line II-II.
Figure 3:
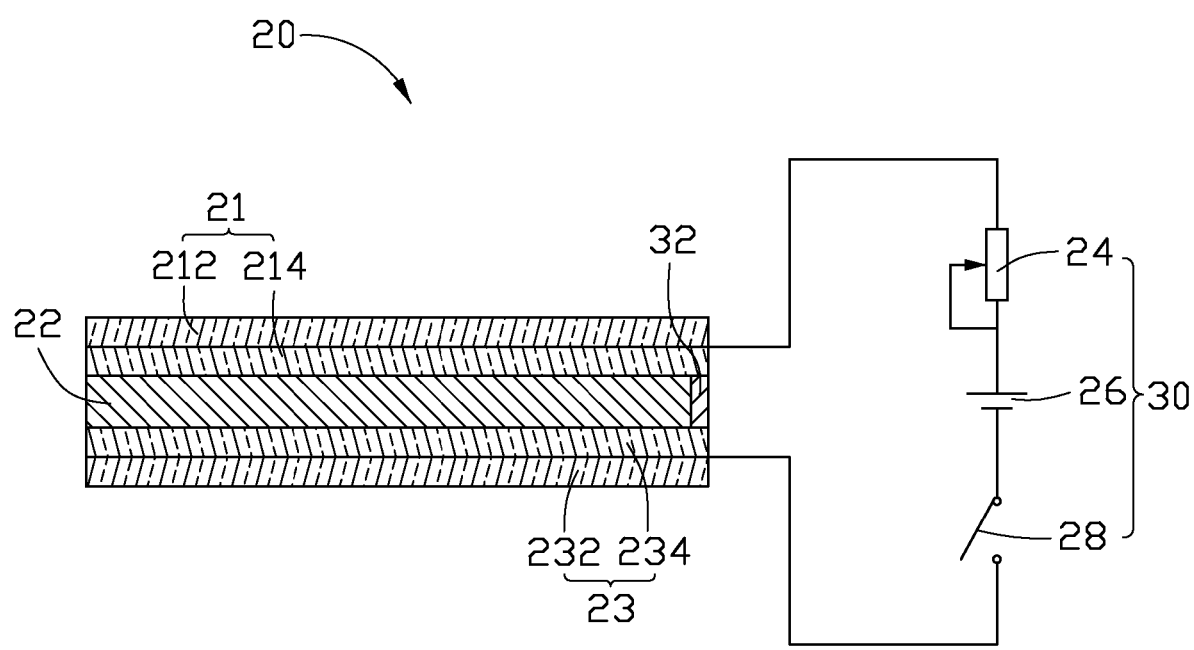
FIG. 3 is a cross-sectional view of the shutter in FIG. 1, the shutter being in a second state.

Referring to FIGS. 1 to 3, a shutter 20, according to a first exemplary embodiment includes a first light-pervious electrode 21, a second light-pervious electrode 23, a light shielding layer 22 and an electrical voltage supplying system 30. The first light-pervious electrode 21 is aligned with the light-pervious electrode 23 and spaced from the second light-pervious electrode 23 by the light shielding layer 22 and a spacer 32.

The first light-pervious electrodes 21 includes a first substrate 212 and a first conductive layer 214 formed on the first substrate 212. The second light-pervious electrode 23 includes a second substrate 232 and a second conductive layer 234 formed on the second substrate 232. The first and second substrate 212 and 232, and the first and second conductive layer 214 and 234 are light pervious. In this embodiment, the first conductive layer 212 is at opposite side of the second conductive layer 232, and the first and second substrates 214 and 234 are away from each other. The first and second conductive layers 212 contact the light-shielding layer 22. The first and second substrates 212 and 232 may include glass or optical plastics. The first and second conductive layer 214 and 234 may include an indium-tin oxide or zinc oxide doped with aluminum. Referring to FIG. 2, in this embodiment, the first and second light-pervious electrodes 21 and 23 may have a rectangle shape. In this embodiment, the first and second light-pervious electrodes 21 and 23 are identical and aligned with each other.

The light shielding layer 22 is comprised of an electrostrictive material. In this embodiment, a material of the light shielding layer 22 includes an electroactive polymer material, for example polyethylene terephthalate or polyvinylidene fluoride. An area that the light shielding layer 22 covers is smaller than the first light-pervious electrode 21 and the second light-pervious electrode 23. The light shielding layer 22 has a fixed end positioned adjacent one edge of the first light-pervious electrode 21, and a free end facing toward the opposite end of the first light-pervious electrode 21. The spacer 32 is positioned at the opposite edge of the first light-pervious electrode 21. The spacer 32 is spaced apart from the light shielding layer 22. In this embodiment, the light shielding layer 22 is extendable perpendicular to a direction from the first light-pervious electrode 21 to the second light-pervious electrode 23.

The electrical voltage supplying system 30 includes a variable resistor 24, a power supply 26 and a switch 28 connected in series. One end of the electrical voltage supplying system 30 is electrically connected with the first light-pervious electrode 21 and the other end is electrically connected with the second light-pervious electrode 23. In this embodiment, the first light-pervious electrode 21 corresponds to an anode of the power supply 26 and the second light-pervious electrode 23 corresponds to a cathode of the power supply 26. The electrical voltage supplying system 30 is configured for generating a voltage between the first and second light-pervious electrodes 21 and 23 to induce an electrostrictive effect in the light shielding layer 22. The resistance of the variable resistor 24 in a circuitry between the first and second light-pervious electrodes 21 and 23 is adjustable. In this embodiment, the variable resistor 24 can be adjustable by changing the position of a contact on a resistive element, such as with a movable sliding contact, known as a potentiometer. Thus the voltage between the first light-pervious electrode 21 and the second light-pervious electrode 23 is variable.

When the switch 28 is in an "on" state, the first light-pervious electrode 21, the light shielding layer 22, the second light-pervious electrode 23 and the electrical voltage supplying system 30 constitute a circuit. Referring to FIG. 3, when a proper voltage is applied to the light shielding layer 22, the light shielding layer 22 begins to extend towards the opposite edge of the first light-pervious electrode 21 and then contacts the spacer 32.

Figure 4:
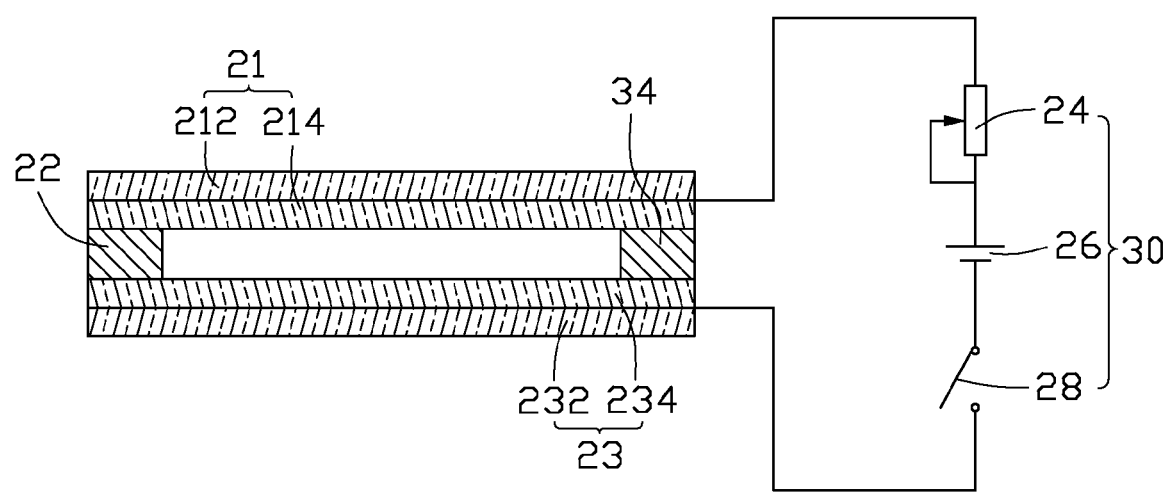
FIG. 4 is a cross-sectional view of a shutter of an alternative embodiment.

Referring to FIG. 4, in an alternative embodiment, the spacer 32 can be replaced by a second light shielding layer 34 comprised of an electrostrictive material. A material of the second light shielding layer 34 is same as or different from the material of the light shielding layer 22. When a proper voltage is applied between the first and second light-pervious electrodes 21 and 23, the light shielding layer 22 and the second light shielding layer 34 will extend towards each other.

Figure 5:
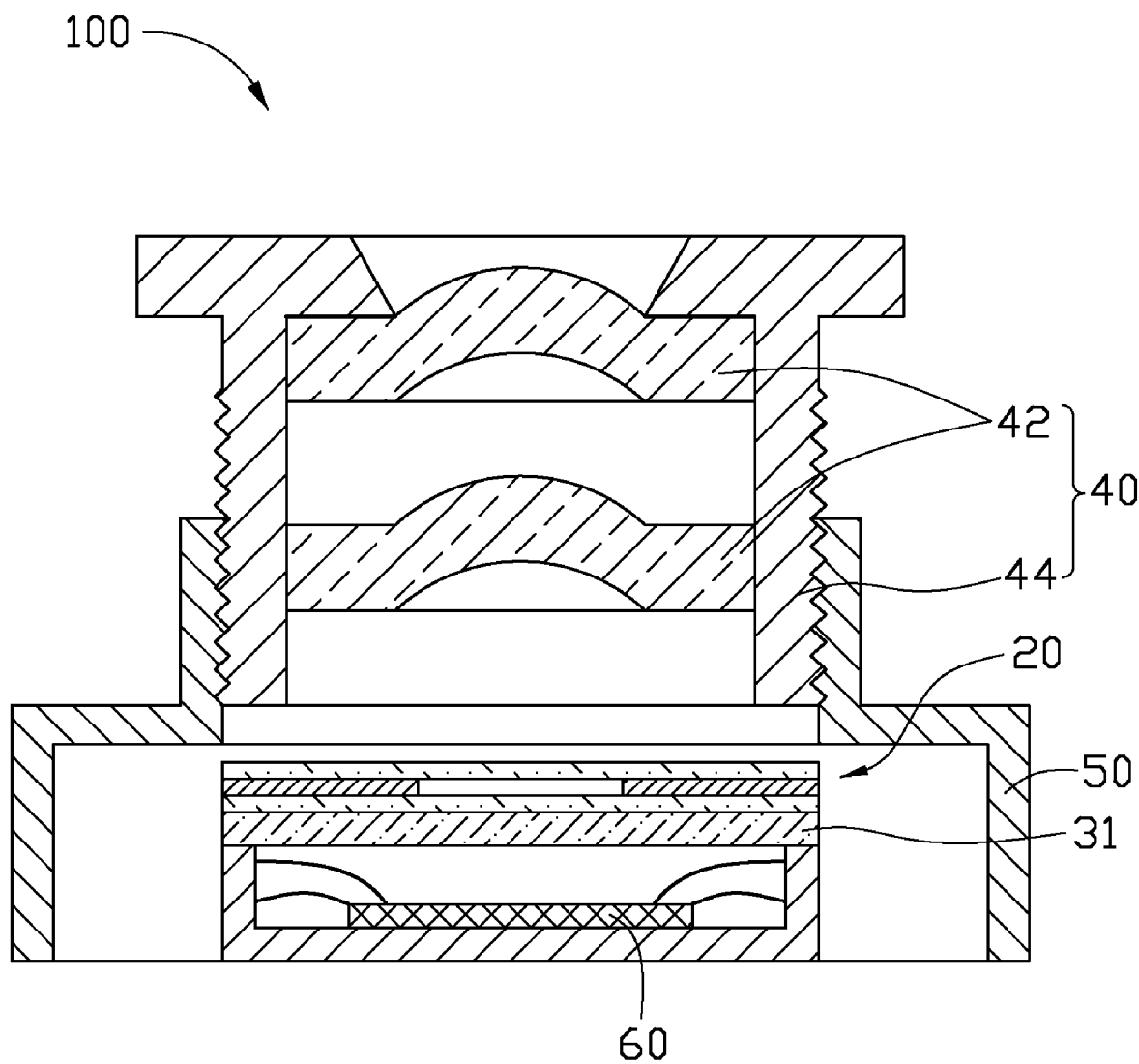
FIG. 5 is a schematic, cross-sectional view of a camera module employing the shutter of FIG. 1 in accordance with a second exemplary embodiment.

Referring to FIG. 5, a camera module 100 utilizing the shutter 20 of the first exemplary embodiment is shown in accordance with a second exemplary embodiment. The camera module 100 includes a lens module 40, a holder 50, a shutter 20 described in the first exemplary embodiment, and an image sensor 60. The lens module 40 includes a plurality of lenses 42 optically aligned with each other and a lens barrel 44 receiving the lenses 42. The lens barrel 44 is threadedly engaged with the holder 50. The shutter 20 and the image sensor 60 are received in the holder 50 and both are optically aligned with the lens module 40. The shutter 20 is positioned between the lens module 40 and the image sensor 60. It is to be understood that the shutter can also be positioned in the lens barrel 44. When no voltage is applied to the light shielding layer 22, light can be transmitted through the first and second light-pervious electrodes 21 and 23 to an image sensor 60. When a voltage is applied to the light shielding layer 22 by the voltage supplying system 30, the light shielding layer 22 extends to contact with the spacer 32, thus the light transmitting into the shutter 20 is blocked by the light shielding layer 22. Thus, the shutter 20 realizes a function of a light switch.

The image sensor 60 can includes a charge coupled device (CCD) or a complementary metal oxide semiconductor. A package type of the image sensor 60 may be ceramic leaded chip carrier (CLCC), plastic leaded chip carrier (PLCC), or chip scale package (CSP). In addition, a dustproof panel 31 is provided between the shutter 20 and the image sensor 60. The shutter is fixed on the dustproof panel 31. The dustproof panel 31 is configured for preventing dust from contaminating a surface of the image sensor 60. The dustproof panel may be made of light-pervious glass or light-pervious plastics. In this embodiment, a control circuit of the shutter 20 can be integrated with a circuit in the image sensor 60, thus reducing volume of the camera module 100.

The camera 100 is equipped with the shutter 20 having a light-shielding layer 22 comprised of an electrostrictive material to replace the mechanical shutters. The light-pervious electrodes 21 and 23, and the light-shielding layer 22 are usually thin. The extension and striction of the light-shielding layer 22 may generate a small sound. Therefore, the shutter 20 can overcome the defects of bulkiness and noise of the mechanical shutters.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A shutter comprising:
a first light-pervious electrode;
a second light-pervious electrode;
a light-shielding layer sandwiched between the first and second light-pervious electrodes, the light-shielding layer comprised of an electrostrictive material, the light-shielding layer having a fixed end positioned adjacent to one edge of the first light-pervious electrode, and a free end facing toward the opposite edge of the first light-pervious electrode, the free end of the light-shielding layer being capable of extension from a first position, where light passes through the first and the second light pervious electrodes without passing through the light-shielding layer, to a second position, where the light is blocked by the light-shielding layer from passing through the first and the second light-pervious electrodes in response to a voltage applied to the light-shielding layer; and
a voltage supplying system electrically connected with the first and second light-pervious electrodes for supplying a voltage between the first and second light-pervious electrodes.

2. The shutter of claim 1, wherein the electrostrictive material is comprised of an electroactive polymer.

3. The shutter of claim 2, wherein an extending direction of the light shielding layer is perpendicular to a direction from the first light-pervious electrode to the second light-pervious electrode.

4. The shutter of claim 2, wherein the electroactive polymer is selected from polyethylene terephthalate and polyvinylidene fluoride.

5. The shutter of claim 2, wherein the light shielding layer has a rectangle shape.

6. The shutter of claim 2, further comprising a spacer between the first and second light-pervious electrodes and adjacent to the opposite edge of the first light-pervious electrode.

7. The shutter of claim 2, further comprising a second light shielding layer between the first and second light-pervious electrodes, the second light shielding layer being adjacent to the opposite edge of the first light-pervious electrode, the second light-shielding layer comprised of an electrostrictive material.

8. The shutter of claim 2, wherein the voltage supplying system comprises a variable resistor, a power supply and a switch connected in series.

9. A camera module comprises:
a holder;
a lens module threadedly engaged with the holder;
an image sensor receiving in the holder and optically aligned with the lens module; and
a shutter positioned between the lens module and the image sensor and aligned with the lens module, the shutter comprising:
a first light-pervious electrode;
a second light-pervious electrode;
a light-shielding layer sandwiched between the first and second light-pervious electrodes, the light-shielding layer comprised of an electrostrictive material, the light-shielding layer having a fixed end positioned adjacent to one edge of the first light-pervious electrode, and a free end facing toward the opposite edge of the first light-pervious electrode, the free end of the light-shielding layer being capable of extension from a first position, where light passes through the first and the second light pervious electrodes without passing through the light-shielding layer, to a second position, where the light is blocked by the light-shielding layer from passing through the first and the second light-pervious electrodes in response to a voltage applied to the light-shielding layer; and
a voltage supplying system electrically connected with the first and second light-pervious electrodes for supplying a voltage between the first and second light-pervious electrodes.

10. The camera module of claim 9, wherein the electrostrictive material is comprised of an electroactive polymer.

11. The camera module of claim 10, wherein an extending direction of the light shielding layer is perpendicular to a direction from the first light-pervious electrode to the second light-pervious electrode.

12. The camera module of claim 10, wherein the electroactive polymer is selected from polyethylene terephthalate and polyvinylidene fluoride.

13. The camera module of claim 10, wherein the light shielding layer has a rectangle shape.

14. The camera module of claim 10, wherein the voltage supplying system comprises a variable resistor, a power supply and a switch connected in series.

15. The camera module of claim 10, wherein the shutter is fixed with the image sensor.

16. The camera module of claim 10, further comprising a dustproof panel sandwiched between the shutter and the image sensor for keeping the image sensor from dust, the shutter being fixed on the dustproof panel.

* * * * *